US007278646B2

(12) United States Patent
Chuang

(10) Patent No.: US 7,278,646 B2
(45) Date of Patent: Oct. 9, 2007

(54) MOVABLE TABLE STAND

(76) Inventor: Bor-Yann Chuang, No. 78, Yungfeng Rd., Taiping City, Taichung (TW) 411

(*) Notice: Subject to any disclaimer, the term of this patent is extended or adjusted under 35 U.S.C. 154(b) by 243 days.

(21) Appl. No.: 11/245,213

(22) Filed: Oct. 7, 2005

(65) Prior Publication Data

US 2007/0080488 A1 Apr. 12, 2007

(51) Int. Cl.
*B62B 3/00* (2006.01)
*B62B 1/00* (2006.01)
*B62C 1/00* (2006.01)
*A47B 3/00* (2006.01)
*B26D 1/18* (2006.01)

(52) U.S. Cl. .............................. 280/47.34; 280/47.35; 280/79.11; 280/640; 280/638; 280/40; 280/63; 108/115; 108/118; 108/131; 108/132; 108/133; 83/477.2

(58) Field of Classification Search ............ 280/47.34, 280/47.35, 79.11, 640, 638, 40, 63; 108/118, 108/115, 131-133; 83/477.2
See application file for complete search history.

(56) References Cited

U.S. PATENT DOCUMENTS 1,982,205 A * 11/1934 Doman ...................... 108/117
2,624,469 A * 1/1953 Adamson et al. .......... 108/116
6,152,462 A * 11/2000 Barrett ........................ 280/30
6,182,935 B1 * 2/2001 Talesky ...................... 248/436
7,204,343 B1 * 4/2007 Seaman ....................... 182/29
2005/0120922 A1 * 6/2005 Brooks ....................... 108/118
2006/0075943 A1 * 4/2006 Chen et al. ................ 108/115

* cited by examiner

*Primary Examiner*—Christopher P. Ellis
*Assistant Examiner*—John R. Olszewski
(74) *Attorney, Agent, or Firm*—Ming Chow; Sinorica, LLC

(57) ABSTRACT

A movable table stand is mainly composed of a platform, a first foot frame, a second foot frame and a joint member. The platform has an upper surface for a table saw to be mounted thereon and provided with a sliding groove at its two lengthwise sides respectively. A locking member is set at a front end of each sliding groove. The first foot frame is fixed pivotally with a supporting shaft having a sliding pivot at its two sides respectively for sliding along the sliding groove of the platform. The second foot frame is provided with a fixing bolt at its two sides respectively able to insert coordinately into the joint member. The joint member is fixed on the first foot frame and connected pivotally with the platform and the second foot frame.

5 Claims, 5 Drawing Sheets

MOVABLE TABLE STAND

BACKGROUND OF THE INVENTION

1. Field of the Invention

This invention relates to a table stand, particularly to one having an upper surface for a table saw to be mounted thereon, easy to be extended out and folded up and able to move around freely.

2. Description of the Prior Art

Common conventional movable stand, as shown in FIG. 1, is provided with four feet 1 fixed pivotally at preset positions under its platform and set with two wheels 2 beside the platform, able to move after the feet 1 are folded up to lie under the bottom of the platform. But, it needs two persons to hold the table saw and make it tilted before the feet 1 are able to be folded up. So the conventional one has an effect for movement only, impossible to save any space even it is folded up. This invention has been devised to improve the defects mentioned above.

SUMMARY OF THE INVENTION

The prime object of this invention is to offer a movable table stand.

The main characteristics of the invention are a platform, a first foot frame, a second foot frame and a joint member. The platform is has an upper surface for a table saw to be mounted thereon and provided with a sliding groove at its two sides respectively. A switch member is set at a preset position at a front end of each sliding groove. The first foot frame is connected pivotally at a preset position with a supporting shaft having a sliding pivot at its two sides respectively for sliding along the sliding groove of the platform and being able to be locked restrictively by a locking member. The first foot frame is assembled with a roller at two sides, having a horizontal paw formed at the lower end sections of its two feet respectively. Such a movable table stand can be operated only by one person. And, because of the horizontal paws of the first foot frame, the movable stand in this invention is able to stand vertically on the ground, saving space while staying idle.

BRIEF DESCRIPTION OF DRAWINGS

This invention is better understood by referring to the accompanying drawings, wherein.

DETAILED DESCRIPTION OF THE PREFERRED EMBODIMENT

Figure 1:
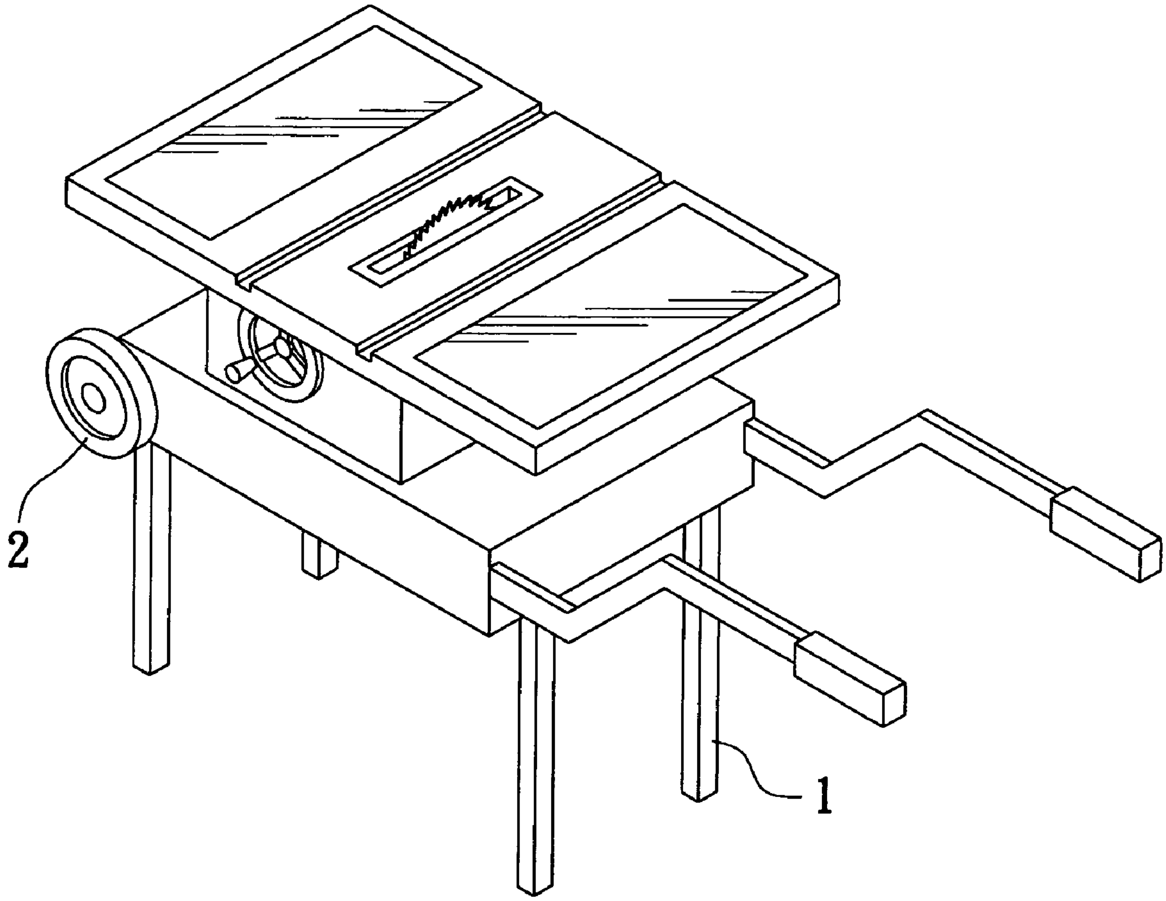
FIG. 1 PRIOR ART
FIG. 1 is perspective view of a conventional movable stand.
Figure 2:
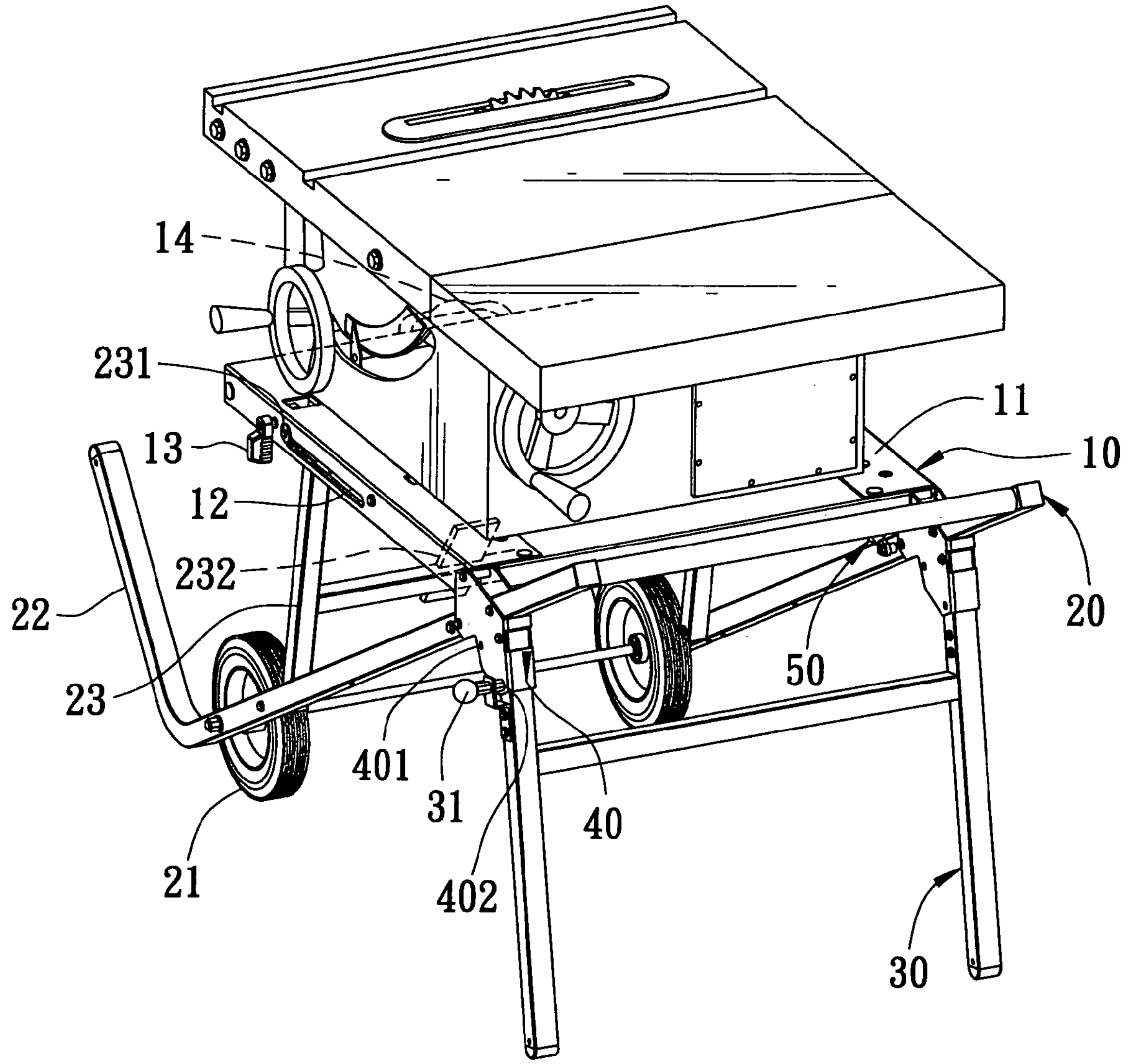
FIG. 2 is a perspective view of a preferred embodiment of a movable table stand in the present invention.
Figure 3:
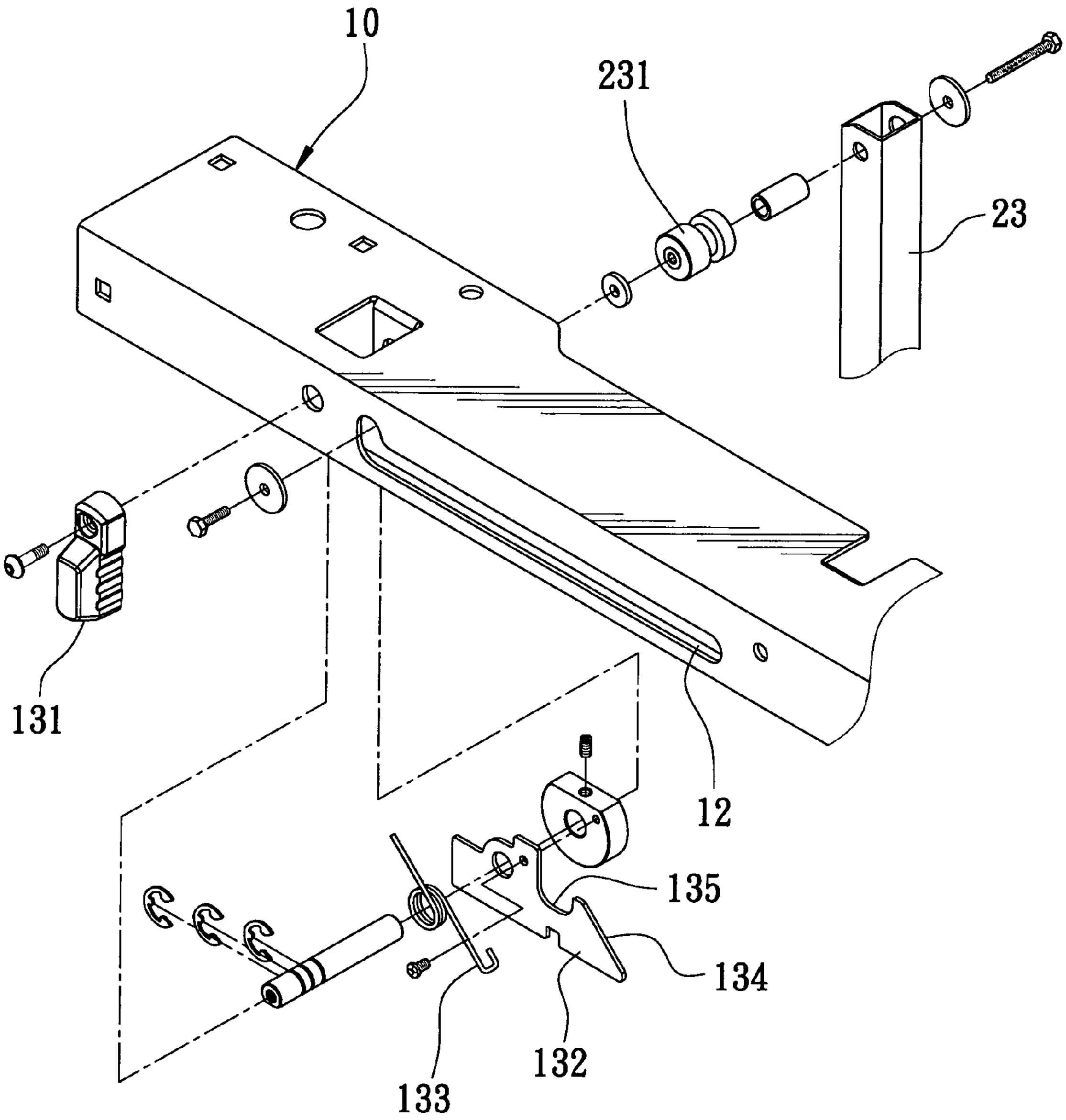
FIG. 3 is a partial exploded perspective view of the preferred embodiment of the movable table stand in this invention.
Figure 4:
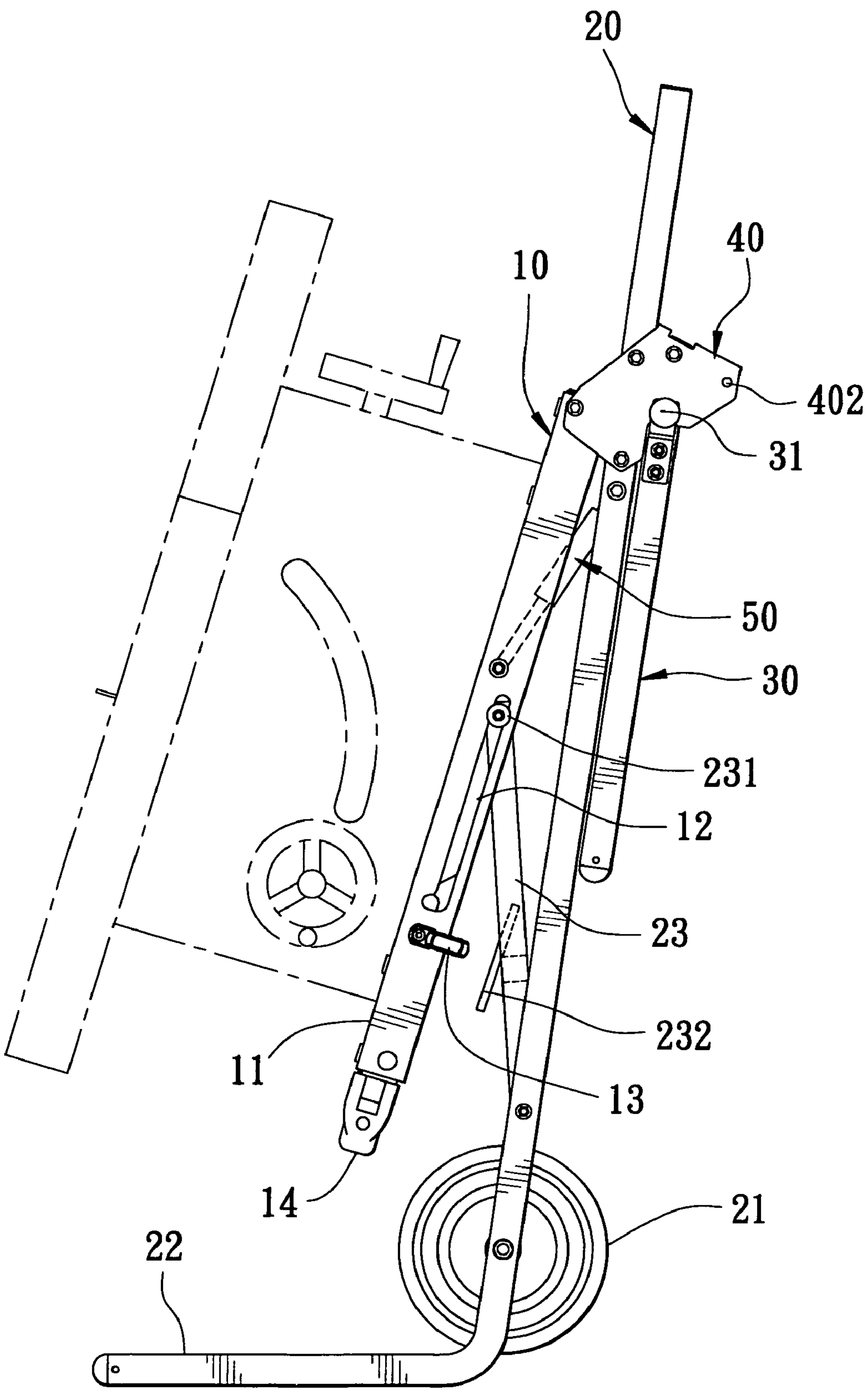
FIG. 4 is side view of the preferred embodiment of the movable table stand in this invention, showing it in a collapsed state.
Figure 5:
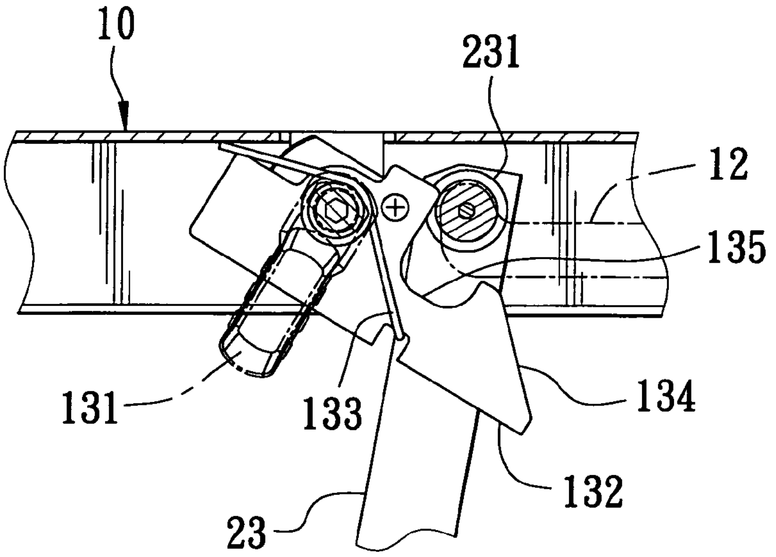
FIG. 5 is perspective view of a locking member of the preferred embodiment in the present invention, showing the locking released.
Figure 6:
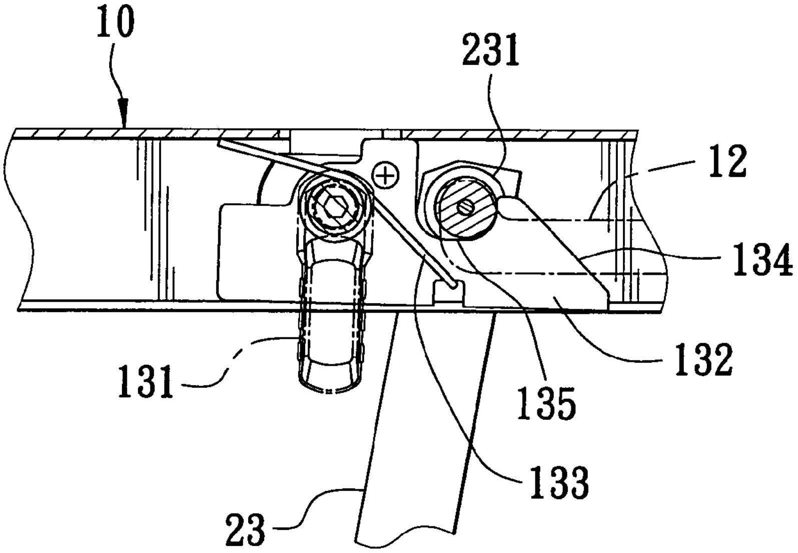
FIG. 6 is perspective view of the locking member of the preferred embodiment in the present invention, showing the locking member locked.

As shown in FIGS. 2 and 3, a preferred embodiment of a movable table stand in this present invention includes a platform 10, a first foot frame 20, a second foot frame 30, two joint members 40 and two pressure cylinders 50.

The platform 10 possesses an upper surface 11, on which a table saw is to be mounted, and is provided with a sliding groove 12 at a preset position in its two lengthwise sides respectively. One of the sliding grooves 12 is set with a locking member 13 at its front end, and the locking member 13 is composed of a swing button 131, a restrictive member 132 and a spring 133. The swing button 131 is fixed pivotally at a preset position at the front end of each sliding groove 12. The restrictive member 132 is fixed together with the swing button 131, provided with a slope 134 at its front end and a lock recess 135 behind the slope 134 facing exactly the end of the sliding groove 12. The spring 133 is fixed together with the restrictive member 132 and fixed with the platform 10 at a preset position with its one end. Further, a handle 14 is set at a preset position at the front end of the platform 10.

The first foot frame 20 is formed as an inverted U-shape in its main portion and assembled with a roller 21 at its two feet respectively, enabling the movable stand to move around freely after the feet are folded up. Extended from each foot's end of the first foot frame 20 is a horizontal paw 22. A supporting shaft 23 is fixed pivotally with its one end at a preset position at two feet of the first foot frame 20 and formed as an H-shape. The other end of the supporting shaft 23 pivotally connected to the first foot frame 20 is provided with a sliding pivot 231 able to slide along the sliding groove 12 and be locked up by the locking recess 135 of the switch member 13. Further, a pedal 232 is set at a preset position at the middle of the supporting shaft 23.

The second foot frame 30, formed as an H-shape, is provided with a fixing pin 31 at a preset position outwards at an outer side of one foot.

The joint member 40 is respectively fixed at a preset position on the two feet of the first foot frame 20 and connected pivotally with the platform 10 and the second foot frame 30, so as to control steadily a preset angle between the first foot frame 20 and the second foot frame 30 for extended out for using or folded up for remaining idle respectively. And, two fixing holes 401 and 402 are bored at each of the joint members 40 coordinating to the fixing bolt of the second foot frame 30.

The pressure cylinders 50 are fixed respectively at a preset position of the platform 10 and the first foot frame 20.

In using, as shown in FIGS. 2,4,5 and 6, when the movable table stand is to be made to stand for using, the fixing bolts 31 of the second foot frame 30 must be moved from the fixing holes 401 of the joint members 40 to the fixing holes 402 first and then, keep the second foot frame 30 stand on the ground. Next, lift up the handle 14 of the platform 10, helped with a pushing force the pressure cylinders 50, saving energy for lifting. By the time, the sliding pivots 231 of the supporting shaft 23 are naturally able to slide along the sliding grooves 12, relatively enabling the supporting shaft 23 to move. When the sliding pivots 231 moves to touch with the restrictive member 132, the slopes 134 will guide the sliding pivots 231 into the locking recesses 135, making the sliding pivots 231 immovable temporarily.

On the contrary, when the movable table stand is to be folded up, the swing button 131 of the locking member 13 must be swung to release each restrictive member 132 so that the sliding pivots 231 can freely slide along the sliding grooves 12 again and, in addition, the pedal 232 has to be pushed up to keep the supporting shaft 23 move forwards, enabling the platform 10 to tilt near to the first foot frame 20, helped with a buffer force by the pressure cylinders 50, making tilting action go smoothly without any danger of folding up quickly that is possibly caused by the gravity of the table saw. Then, the fixing bolts 31 have to be shifted from the fixing holes 402 to the fixing holes 401. Next, the rollers 21 can displace the movable stand to wherever for staying idle, and the horizontal paws 22 are able to keep the movable stand vertically on the ground for saving space.

Finally, the characteristics and advantages of the movable table stand are listed as below:

1. A movable stand in this invention is able to be extended out and folded up easily, able to move around freely and able to stand vertically on the ground, achieving a simple and effective idle arrangement for a table saw.

2. The pressure cylinders 50 assembled at two sides of the platform 10 and the first foot frame 20 provide a buffer force to prevent a sudden fall of the table saw while folding up the movable stand and a pushing force to help lift the table saw while extending out the movable stand.

While the preferred embodiment of the invention has been described above, it will be recognized and understood that various modifications may be made therein and the appended claims are intended to cover all such modifications that may fall within the spirit and scope of the invention.

What is claimed is:

1. A movable table stand comprising:

A platform having an upper surface for a table saw to be mounted thereon and provided with a sliding groove at a preset position at its two sides respectively, one of said sliding grooves having a locking member (13) at a front end tip;

A first foot frame formed as an inverted U-shape in its main portion and fixed pivotally with a supporting shaft at a preset position, said supporting shaft provided with a sliding pivot at its upper end, said sliding pivot possible to slide along said sliding groove and then locked up by said locking member (13), each of the two ends of said first foot frame assembled with a roller to enable said first foot frame to move freely after said movable stand is folded up, said each foot having its lower end section formed as a horizontal paw;

A second foot frame formed as an H-shape in its main portion and set with a fixing pin at its two feet respectively; and Two joint members fixed respectively at a preset position on said two feet of said first foot frame and connected pivotally with said platform and said second foot frame so as to adjust a preset angle between the first foot frame (20) and the second foot frame (30) for extending out for using or folded up for remaining idle, said joint members respectively having two fixing holes corresponding to said fixing pin of said second foot frame.

2. A movable table stand as claimed in claim 1, wherein said locking member (13) is composed of a swing button, a restrictive member and a spring, said swing button is pivotally connected at a preset position in a front end of said sliding grooves, said restrictive member is fixed together with said swing button and provided with a slope at its front side for guiding said sliding pivot to fit into a locking recess and get locked up immovable temporarily in it, and said restrictive member is fixed with said spring as well.

3. A movable table stand as claimed in claim 1, wherein said platform is set with a handle at its front side.

4. A movable table stand as claimed in claim 1, wherein said supporting shaft is formed as an H-shape in its main portion and provided with a pedal at a preset position in its intermediate portion.

5. A movable table stand as claimed in claim 1, wherein two pressure cylinders are set at preset location on said first foot frame and two sides of said platform.

* * * * *